No. 864,906. PATENTED SEPT. 3, 1907.
A. J. MORSE.
TRANSMISSION GEAR.
APPLICATION FILED OCT. 20, 1906.
2 SHEETS—SHEET 1.
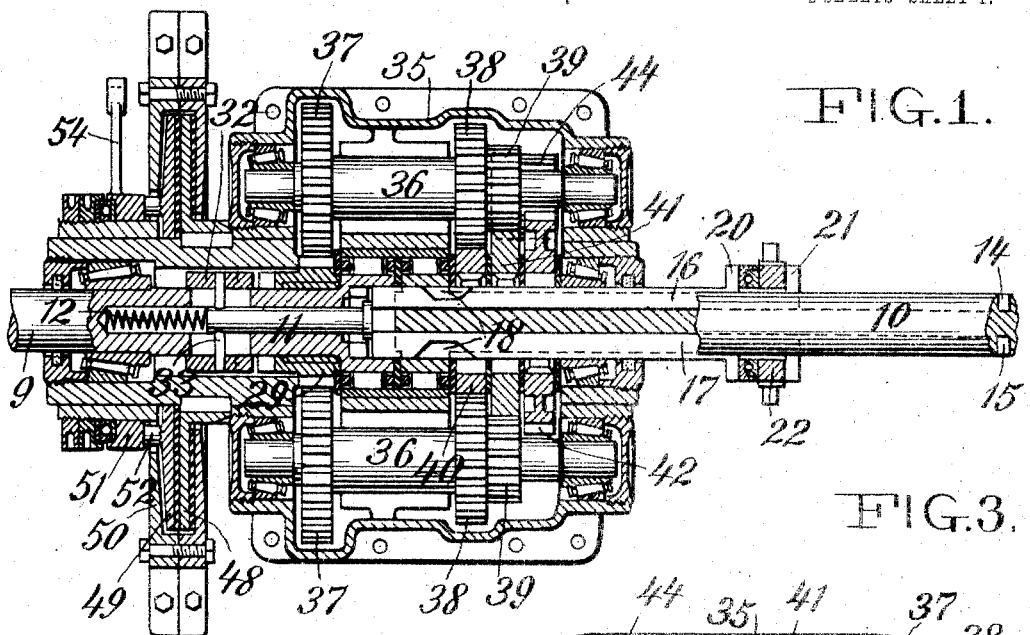
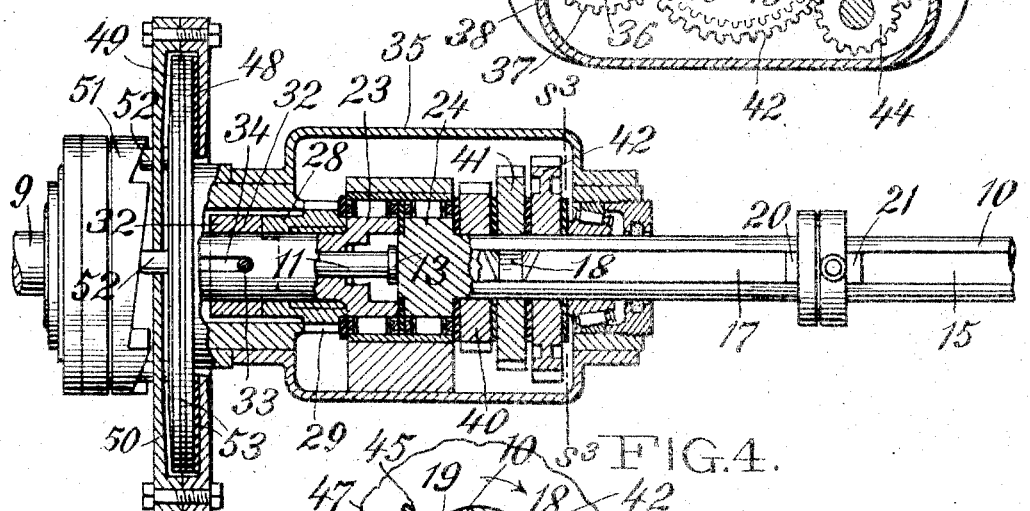
WITNESSES: INVENTOR
Arthur J. Morse
BY
Robt. H. Benjamin
ATTORNEY

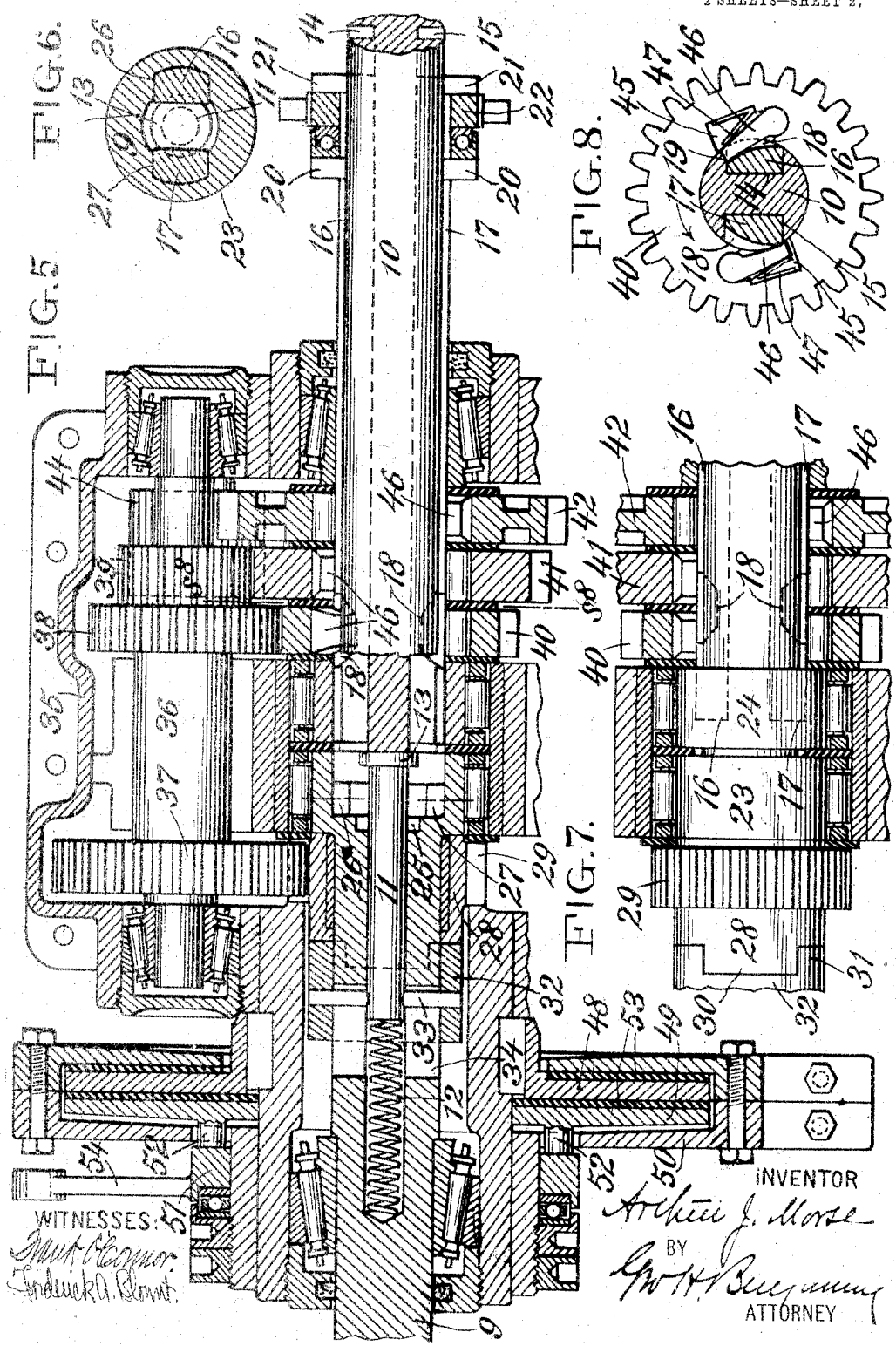

UNITED STATES PATENT OFFICE.

ARTHUR JACOB MORSE, OF TORRINGTON, CONNECTICUT, ASSIGNOR OF ONE-HALF TO ADELBERT P. HINE, OF TORRINGTON, CONNECTICUT.

TRANSMISSION-GEAR.

No. 864,906.   Specification of Letters Patent.   Patented Sept. 3, 1907.

Application filed October 20, 1906. Serial No. 339,857.

*To all whom it may concern:*

Be it known that I, ARTHUR JACOB MORSE, a citizen of the United States, residing at Torrington, county of Litchfield, State of Connecticut, have invented certain new and useful Improvements in Transmission-Gears, of which the following is a specification.

This invention relates to transmission gearing, such as employed to connect driving and driven shafts to rotate the latter at different speeds and in the same or in a reverse direction, where the power for the former is derived from a motor the speed of which is substantially constant.

The present invention particularly contemplates further improvements in the means for applying the general principles involved in the transmission gearing shown and described by me in my earlier application for patent, filed June 13, 1906, Serial No. 321,471,—these further improvements particularly consisting in a more positive and dependable clutch for direct drive; better means for insuring automatic disconnection of all gearing from the shafts when the latter are directly coupled; simpler, more easily operated and more efficient selective clutch mechanism for the changeable-speed gear trains, and a construction which permits of the employment of roller bearings to reduce friction.

My invention will be more readily understood by reference to the accompanying drawings, forming a part of this specification, in which I have illustrated a convenient embodiment thereof, and in which—

Figure 1 is a longitudinal section of a device embodying my invention, showing the shafts disconnected from the gearing and from each other, there being, therefore, no transmission of power. Fig. 2 is a partly sectional plan view, showing the shafts connected through the low speed gear train. Fig. 3 is a transverse section, substantially on the line $s^3$, $s^3$, of Fig. 2. Fig. 4 is an enlarged sectional detail view of the driven shaft and the selective clutch rods, showing one of the terminal gears and its pair of spring dogs, hereinafter described. Fig. 5 is an enlarged longitudinal section, similar to Fig. 1, showing the shafts connected through the intermediate speed gears. Fig. 6 is a cross-sectional detail view of the direct drive clutch. Fig. 7 is an enlarged sectional view of portions of the gearing, showing the contiguous ends of the shafts, the direct driving clutches and the main driving gear clutch. Fig. 8 is a transverse section, substantially on the line $s^8$, $s^8$, of Fig. 7.

Referring now to the drawings in detail: I have shown a driving shaft 9, rotated at a substantially uniform rate of speed from any convenient source of power (not shown) and from which it is desired to transmit motion to the driven shaft 10, alined therewith, in the same or in a reverse direction and at the same or a reduced rate of speed. The driving shaft 9 is bored out to receive the rod 11 and the compression spring 12 acting against the interior end of said rod. The rod 11 terminates in a head or enlarged portion 13, the function of which will be hereinafter explained.

The driven shaft 10 is provided on opposite sides with longitudinal and preferably rectangular grooves or key-ways 14, 15, within which are slidably mounted the correspondingly shaped bars or sliding keys 16, 17, respectively. As stated, each of these bars or keys substantially conforms in cross-sectional configuration to that of the groove within which it slides, and near its inner end is provided with a depression, notch or recess 18. Longitudinally, this notch or recess is provided with gently tapering or inclined sides, as best shown in Fig. 1, while transversely, it tapers or curves gradually from the surface of the shaft 10, in one direction, to form with the side of the groove in the shaft a shoulder or stop 19, as shown in Figs. 4 and 8.

In order that the bars or keys 16, 17, may be operated during rotation of the shaft 10, I have shown them provided at their ends with projecting lugs 20, 21, between which is a loose collar 22, which may be operated by a yoke and lever in the common and well-known manner of clutch operating devices.

The contiguous ends of the shafts 9 and 10 are preferably enlarged, as shown, to form the heads 23 and 24, respectively. The inner ends of the keys 16, 17, pass through suitable bores in the head 24 of the shaft 10, and impinge, when moved to the left (referring to the device as illustrated in drawings), against the head 13 of the rod 11. The head 23 of the driving shaft 9 is provided, first, with a deeper recess or pocket 25, forming a chamber to receive the head 13, and second, with recesses or pockets 26, 27, corresponding in shape to the ends of the keys 16, 17. It will be apparent that full inward movement of the keys 16, 17, will, through the head 13, operate to force back the rod 11 against the action of its spring 12, and seat the ends of said rods in the pockets 26, 27, the head 13 receding into the deeper pocket 25. The two shafts will then be directly coupled for direct transmission of power from one to the other.

Indirect transmission, for varying the speed or reversing the direction of rotation of the driven shaft 10, is effected through the employment of certain trains of gears, which will be hereinafter described, but all of which gear trains have a common driving gear and have no motion except as imparted by movement of said driving gear. It is, therefore, desirable, as will subsequently more clearly appear, that the driving gear, which is of course mounted on the driving shaft, be disconnected when the driving and the driven shafts are coupled for direct transmission. To this end I have shown a sleeve 28, loose upon the driving shaft 9 and carrying the main driving gear 29. This sleeve has projections 30, which interlock with similar and opposite projections 31 on the loose sleeve or collar 32 to form an interlocking clutch, or any other preferred form of clutch may be employed. The sleeve or collar 32 is slidable back and forth on the shaft 9 by means of a pin 33, extending through and fixed in the rod 11, and which has a limited play in the slot 34 in said shaft. It will be apparent that when the rod 11 is moved against the action of its spring, as the direct clutch is rendered effective, the pin 33 will withdraw the sleeve or collar 32 from the sleeve 28, carrying the driving gear 29, and disconnecting said sleeve and therefore the gear 29 from the shaft 9. When the keys 16, 17, are withdrawn to disconnect the shafts, the spring 12 returns the rod 11 and through the pin 33 connects the driving gear 29 through the clutch mechanism just described.

I prefer that the indirect transmission gearing should be inclosed within a suitable gear box or casing 35, in the sides of which is journaled the shaft 36, carrying a fixed gear 37, meshing with the main driving gear 29. This shaft 36 carries the fixed reducing gears 38, 39, meshing, respectively, with the gears 40 and 41, loose upon the driven shaft 10, and between gear 39 and the gear 42, similarly loose upon the shaft 10, is the reversing pinion 44. Each of these loose gears 40, 41, 42, is provided with at least one pocket or recess 45—or preferably two thereof oppositely located, as shown in the drawings—within each of which, as best shown in Fig. 8, is pivoted a dog 46, the free end of which is outwardly pressed by means of a compression spring 47, but which normally lies within its recess or pocket, retained in this position by the contiguous bearing face of the shaft 10. It will be apparent that as the keys 16; 17, are moved back and forth, the notch or recess 18, being properly located, may be made to register with any one of the gears 40, 41, 42, without seating the ends of said rods in the pockets in the head 23 of the shaft 9 for direct transmission. When so registering, as the shaft 10 with the keys 16, 17, is revolved, the notch or recess 18 in one or the other of said rods will pass under the spring-pressed dog 46 (or one of said dogs, if more than one are employed for each gear) of the gear which registers with said notch or recess whereupon said dog will be forced into said notch and engage the shoulder 19, immediately connecting the shaft and gear for rotation of the former by the latter. If the keys 16, 17, are moved in either direction, the dog 46 will ride up the tapering or inclined side of the notch or recess 18 and be forced back into its pocket, and in this manner, by sliding the keys 16, 17, any one of the gears 40, 41, 42, may be coupled to the shaft 10, the others continuing to run loosely thereon; or the rods may be moved to the position indicated in Fig. 1, in which no movement is imparted to the driven shaft, or through the maximum distance to directly couple together the shafts 9 and 10, as explained.

I prefer to employ two sets of interposed reducing gears in order to equalize the strain and give greater strength, and in Fig. 1 have illustrated two counterpart sets, whereof the above description of one will suffice for both, but so far as the actual transmission of power is concerned, it will be obvious that but one set is required. Similarly, it will be apparent that, so far as the reasonably effective operation of the device is concerned, one sliding key might be employed, and one spring dog, instead of two, in each gear.

From the above description it will be apparent that through the employment of a single controlling lever the keys 16, 17, may be given their maximum movement and the shafts 9 and 10 coupled together for direct transmission of power from one to the other. In this case, as has been shown, the main driving gear 29 has been released, permitting the rotation of the shaft 9 independently thereof. During direct transmission of power, therefore, no motion will be imparted to the main driving gear 29, and all gearing will remain at rest. This is an obviously desirable feature, preventing waste of power in doing useless work.

Furthermore, it will be apparent that the same controlling lever may be employed to move the keys 16, 17, through certain steps or distances to effect the engagement with the driven shaft 10 of any one of the gears 40, 41, 42, the other two gears continuing to run loose upon the shaft 10. The keys 16, 17, in this position, being free of the pockets in the head 23 of the shaft 9, and the compression spring 12 having served to return the rod 11 to its normal position and therewith couple the driving gear 29 to the shaft 9, it will be apparent that the driving and driven shafts are connected only through the train of gears, of which the main driving gear 29 is the first and which terminates in the particular gear on the shaft 10 which has, through action of the keys 16, 17, been coupled thereto.

When motion is transmitted through one of the gears 40, 41, 42, as just described, any load upon the driven shaft in excess of the total resistance offered by the weight and friction of the engaging parts of the gearing will oppose rotation of this shaft, and, unless checked, the tendency would be for the gear casing and reducing gears mounted thereon, to revolve in a planetary motion about the driven gears, and the driven shaft to come to rest.

In order to counter-balance the load upon the driven shaft, a suitable friction device is employed comprising two members 48, 49, one of which is connected to the gear casing and the other mounted for independent movement. These members are inclosed in a sectional non-rotatable casing 50, and are moved in and out of effective engagement by means of a cam 51, which coöperates with studs 52 of the loose member of the friction device, such studs projecting through openings in the side of the casing, as shown in Figs. 1, 2 and 5. One or both members of the friction device may be faced with leather or other material, as indicated at 53, or otherwise formed, if desired.

The cam may be given motion through any suitable lever connection, such as that indicated at 54, to throw the friction on or off and hold the gear casing from rotation or permit rotation thereof at any speed desired. A controlling device is thus provided which is effective at all times to vary the speed of the driven shaft without requiring a re-adjustment of the clutch.

Assuming, for example, that the shaft 10 is being driven in the same direction as the driving shaft, at a two to one rotation in speed, as indicated in Fig. 5. If, now, it is desired to further reduce the speed of the driven shaft, the cam is rotated through the lever connection above referred to, permitting more or less slip between the members of the friction device, and there-upon the gear casing and reducing gears carried thereby revolve about the driven gears, which results in a reduction in the speed of the driven shaft. This movement of the cam may be continued until the speed of the rotation of the gear casing equals that of the gear 29, and as there would then be no transmission of power to the driven shaft, the latter would cease to rotate. Obviously, therefore, by shifting the cam, first in one direction and then in the other, any desired change in the speed of the driven shaft may be obtained, and upon again throwing on the friction, the gearing will become effective and the shaft will resume its rotation at a two-to-one rotation in speed, for which it was assumed to be set.

While I have designated the shaft 9 as the driving shaft, from which power is to be transmitted to the shaft 10, it will be apparent that the functions of the shafts, as shown, may be reversed. It will be observed, further, that the various adjustments above described are made without disengaging the gears, and that the speed and direction of rotation of the driven shaft is at all times under complete control.

Many modifications of minor details of my improved transmission gearing will doubtless readily suggest themselves to those skilled in the art to which it appertains, and I therefore do not limit my invention to the specific construction therein shown and described.

Having thus described my invention, I claim:

1. In combination, a driving member, a driven member, normally-operable gearing including planetary gears connecting the members and arranged in a branched train, means for retarding in varying degree the orbital motion of the planetary gears common to the several branches, and a clutch mechanism selectively operable to connect said driven member with any one of said branches and further operable to directly connect said members and disconnect the gearing therefrom.

2. In combination, a driving member, a driven member, gearing including planetary gears interposed between the members and arranged in a main train having branches and a loose initial driving gear, said gearing being permanently mounted in intermeshing relation, means for retarding in varying degree the orbital motion of the planetary gears common to the several branches to vary the speed of the driven member when rotated in either direction, and inter-dependent clutches, normally connecting the driving member with the driving gear and the driven member selectively with one of said branches, and operable to directly connect said members and entirely disconnect said gearing therefrom, and common controlling means for the clutches.

3. In combination, a driving member, a driven member, a changeable-speed gear train including planetary gears interposed between the members and terminating in selective gears loose upon said driven member, said selective gears having pockets provided with spring-pressed dogs, a single operating mechanism operable to engage any one of said dogs to selectively connect said driven member with any one of said terminal gears, and means for controlling the orbital motion of said planetary gears.

4. In combination, a driving member, a driven member, a changeable-speed gear train including planetary gears interposed between the members having the initial gear loose upon said driving member and terminating in selective gears loose upon said driven member, said selective gears having pockets provided with spring-pressed dogs, clutch mechanism normally connecting said driving member with said initial gear, a single mechanism operable to disconnect said clutch or to engage any one of said dogs, and means for controlling the orbital motion of said planetary gears.

In testimony whereof, I affix my signature, in the presence of two witnesses.

ARTHUR JACOB MORSE.

Witnesses:
FREDERICK A. BLOUNT,
FRANK O'CONNOR.